US012222770B2

(12) United States Patent
Zhang et al.

(10) Patent No.: US 12,222,770 B2
(45) Date of Patent: Feb. 11, 2025

(54) MOVEMENT MECHANISM APPLIED TO INNER-FOLDING FLEXIBLE SCREEN TERMINAL AND INNER-FOLDING FLEXIBLE SCREEN TERMINAL

(71) Applicant: HANGZHOU AMPHENOL PHOENIX TELECOM PARTS CO., LTD., Zhejiang (CN)

(72) Inventors: Jiannan Zhang, Zhejiang (CN); Enxie Zhang, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 249 days.

(21) Appl. No.: 17/927,818

(22) PCT Filed: May 12, 2021

(86) PCT No.: PCT/CN2021/093211
§ 371 (c)(1),
(2) Date: Nov. 25, 2022

(87) PCT Pub. No.: WO2021/238651
PCT Pub. Date: Dec. 2, 2021

(65) Prior Publication Data
US 2023/0221773 A1    Jul. 13, 2023

(30) Foreign Application Priority Data

May 27, 2020   (CN) ......................... 202020927703.X (51) Int. Cl.
*G06F 1/16*        (2006.01)
(52) U.S. Cl.
CPC .......... *G06F 1/1681* (2013.01); *G06F 1/1652* (2013.01)

(58) Field of Classification Search
CPC ............................ G06F 1/1681; G06F 1/1652
See application file for complete search history.

(56) References Cited

U.S. PATENT DOCUMENTS

| | | | | |
|---|---|---|---|---|
| 10,827,631 | B2 * | 11/2020 | Liu | G09F 9/301 |
| 10,883,534 | B2 * | 1/2021 | Bae | G06F 1/1652 |
| 2021/0355988 | A1 * | 11/2021 | Cheng | G06F 1/1681 |

FOREIGN PATENT DOCUMENTS

| | | |
|---|---|---|
| CN | 107654484 A | 2/2018 |
| CN | 207977993 U | 10/2018 |

(Continued)

*Primary Examiner* — James Wu
(74) *Attorney, Agent, or Firm* — MUNCY, GEISSLER, OLDS & LOWE, P.C.

(57) ABSTRACT

A movement mechanism applied to an inner-folding flexible screen terminal includes an intermediate support structure having a flexible screen support surface, left-side and right-side rotation connection structures, and left-side and right-side connecting members. Inner ends of the left-side and right-side rotation connection structures are both rotatably connected to the intermediate support structure. The left-side and right-side connecting members are respectively rotatably connected to outer ends of the left-side and right-side rotation connection structures, and are respectively slidably connected to left-side and right-side support frames. By pressing a pressing structure to the rotation structure, when a flexible screen mobile terminal is unfolded, the left and right casings can be prevented from rotating and shaking, and the unfolded state is stably maintained. It is suitable for adopting multiple segments of rotation structures to cooperate with the pressing structure, thereby reducing the risk of getting stuck during rotation.

9 Claims, 6 Drawing Sheets (56) References Cited

FOREIGN PATENT DOCUMENTS

| | | |
|---|---|---|
| CN | 108924296 A | 11/2018 |
| CN | 208353382 U | 1/2019 |
| CN | 109872630 A | 6/2019 |
| EP | 2993551 A1 | 3/2016 |

* cited by examiner

MOVEMENT MECHANISM APPLIED TO INNER-FOLDING FLEXIBLE SCREEN TERMINAL AND INNER-FOLDING FLEXIBLE SCREEN TERMINAL

FIELD OF THE INVENTION

The present invention relates to an inner-folding flexible screen terminal and a hinge thereof.

BACKGROUND OF THE INVENTION

In the current inner-folding flexible screen terminal, there is a structure that enables the left and right casings of the flexible screen terminal to slide to improve the protection of the flexible screen when the flexible screen terminal is folded. For an inner-folding flexible screen terminal with a large size, for example a notebook computer, when the above structure is applied, it is easy to get stuck due to its large movement stroke; and it is difficult to deal with the smooth movement and shaking simultaneously during the design and manufacturing.

SUMMARY OF THE INVENTION

The present invention provides a movement mechanism applied to an inner-folding flexible screen terminal, aiming at enabling smooth movement relative to an inner-folding flexible screen mobile terminal with a large size, and solving the problem of shaking of a casing. The present invention adopts the following technical solution:

A movement mechanism applied to an inner-folding flexible screen terminal comprises an intermediate support structure, the intermediate support structure being provided with a flexible screen support surface, wherein the intermediate support structure is connected to a left-side support frame and a right-side support frame through a synchronous reverse rotation connection mechanism; the movement mechanism is characterized by further comprising a left-side rotation connection structure, a right-side rotation connection structure, a left-side connecting member and a right-side connecting member; inner ends of the left-side rotation connection structure and the right-side rotation connection structure are both rotatably connected to the intermediate support structure; the left-side connecting member and the right-side connecting member are respectively rotatably connected to outer ends of the left-side rotation connection structure and the right-side rotation connection structure; the left-side connecting member and the right-side connecting member are respectively slidably connected to the left-side support frame and the right-side support frame, and the sliding directions are perpendicular to rotation axes of the left-side support frame and the right-side support frame; and the left-side connecting member and the right-side connecting member are respectively arranged at connecting positions of a left-side casing and a right-side casing of the flexible screen terminal;

the positions of the rotation axes of the left-side rotation connection structure and the left-side support frame are configured in a mode that in a process from unfolding to folding of the flexible screen terminal, the left-side connecting member moves in a direction away from the intermediate support structure, and in the process from folding to unfolding, the left-side connecting member moves towards the intermediate support structure;

the positions of rotation axes of the right-side rotation connection structure and the right-side support frame are configured in a mode that in a process from unfolding to folding of the flexible screen terminal, the right-side connecting member moves in a direction away from the intermediate support structure, and in the process from folding to unfolding, the right-side connecting member moves towards the intermediate support structure; and the rotation axes for rotation connection of the left-side rotation connection structure and the intermediate support structure and rotation connection of the right-side rotation connection structure and the intermediate support structure are both higher than the flexible screen support surface of the intermediate support structure and are close to or positioned at a height of a neutral layer of a flexible screen.

Furthermore, the intermediate support structure is internally provided pressing structures of the left-side rotation connection structure and the right-side rotation connection structure.

Further, connection structures between the left-side rotation connection structure and the intermediate support structure and between the right-side rotation connection structure and the intermediate support structure each comprises two segments of concentric rotation connection structures, and each segment of rotation connection structure adopts an arc guide rail and arc sliding block rotation connection structure; and front-back connection of the two segments of rotation connection structures in a rotation stroke is achieved through a limiting structure.

Further, the left-side rotation connection structure and the right-side rotation connection structure each comprises a rotation connection arm; the rotation connection arms are rotatably connected to the intermediate support structure through intermediate rotation blocks; and the intermediate rotation blocks and the intermediate support structure, the rotation connection arms and the intermediate rotation blocks are rotatably connected through arc guide rails and arc sliding blocks.

Further, the pressing structures adopt pressing block and spring support structures, and the pressing directions of the pressing structures are radial directions or pressing directions providing the rotating opening torque for the left-side rotation connection structure and the right-side rotation connection structure.

Further, when the inner-folding flexible screen mobile terminal is in an opening and unfolding state, the pressing directions are obliquely upward and outward directions.

Further, the pressing structures act on inner ends of the rotation connection arms to press gaps between the rotation connection structures and the intermediate support structure.

Further, the movement mechanism is further provided with a left-side movable support plate and a right-side movable support plate, and the left-side movable support plate and the right-side movable support plate are respectively rotatably connected with an upper portion of a left side and an upper portion of a right side of the intermediate support structure; the left-side movable support plate and the right-side movable support plate are further movably connected with the left-side support frame and the right-side support frame respectively; and through connection cooperation of the left-side support frame and the right-side support frame with the left-side movable support plate and the right-side movable support plate, the rotation of the left-side movable support plate and the right-side movable support plate can be controlled, and the left-side movable support plate and the right-side movable support plate are supported when the inner-folding flexible screen terminal is unfolded.

Further, the movement mechanism is further provided with the left-side movable support plate and the right-side movable support plate; outer-side ends of the left-side rotation connection structure and the right-side rotation connection structure respectively extend into lower portions of the left-side movable support plate and the right-side movable support plate; and the left-side connecting member and the right-side connecting member are respectively positioned below the left-side movable support plate and the right-side movable support plate.

Further, rotation centers of the left-side support frame and the right-side support frame are lower than the flexible screen support surface; positions of the rotation centers of the left-side support frame and the right-side support frame in a left-right direction are closer to a center line of the intermediate support structure than rotation centers of the left-side rotation connection structure and the right-side rotation connection structure.

Another object of the present invention is to provide an inner-folding flexible screen terminal applying the above-mentioned movement mechanism. Therefore, the present invention adopts the following technical solution:

an inner-folding flexible screen terminal comprises a flexible screen, a left-side casing and a right-side casing, and is characterized by further comprising the movement mechanism applied to the inner-folding flexible screen terminal, wherein the left-side casing is connected with the left-side connecting member; the right-side casing is connected with the right-side connecting member; the flexible screen is respectively fixedly connected with the left-side casing and the right-side casing; and when the flexible screen terminal is unfolded, the flexible screen is supported by support plates in the left-side casing and the right-side casing from two sides.

By means of the pressing of the pressing structures to the rotation structure, when the flexible screen mobile terminal is unfolded, the left and right casings can be prevented from rotating and shaking, and the unfolded state is stably maintained; and it is suitable for adopting multiple segments of rotation structures to cooperate with the pressing structures, thereby reducing the risk of getting stuck during rotation.

DETAILED DESCRIPTION

As shown in the accompanying drawings, a movement mechanism applied to an inner-folding flexible screen terminal provided by the present invention comprises an intermediate support structure, wherein the intermediate support structure comprises an intermediate casing 300 and an internal mounting foundation 301; a top surface of the intermediate support structure is configured to be a flexible screen support surface 10 in an intermediate portion of the inner-folding flexible screen terminal; and the intermediate support structure is connected to a left-side support frame 31 and a right-side support frame 32 through a synchronous reverse rotation connection mechanism, and thus the left-side support frame 31 and the right-side support frame 32 can synchronously rotate reversely.

The movement mechanism further comprises a left-side rotation connection structure, a right-side rotation connection structure, a left-side connecting member 51 and a right-side connecting member 52. The left-side rotation connection structure and the right-side rotation connection structure have a certain length. Inner ends of the left-side rotation connection structure and the right-side rotation connection structure are both rotatably connected to the intermediate support structure; the left-side connecting member 51 and the right-side connecting member 52 are respectively rotatably connected to outer ends of the left-side rotation connection structure and the right-side rotation connection structure through a shaft 45; the left-side connecting member 51 and the right-side connecting member 52 are respectively slidably connected to the left-side support frame 31 and the right-side support frame 32, and the sliding directions are perpendicular to rotation axes of the left-side support frame 31 and the right-side support frame 32; and the left-side connecting member 51 and the right-side connecting member 52 are respectively arranged at connecting positions of a left-side casing 100 and a right-side casing 200 of the inner-folding flexible screen terminal, for example, the connecting positions 53 of multiple screws.

The positions of the rotation axes of the left-side rotation connection structure and the left-side support frame 31 are configured in a mode that in a process from unfolding to folding of the flexible screen terminal, the left-side connecting member 51 (with the left-side casing 100) moves in a direction away from the intermediate support structure, and in the process from folding to unfolding, the left-side connecting member 51 (with the left-side casing 100) moves towards the intermediate support structure.

The positions of rotation axes of the right-side rotation connection structure and the right-side support frame 32 are configured in a mode that in a process from unfolding to folding of the flexible screen terminal, the right-side connecting member 52 (with the right-side casing 200) moves in a direction away from the intermediate support structure, and in the process from folding to unfolding, the right-side connecting member 52 (with the right-side casing 200) moves towards the intermediate support structure.

The rotation axes B1, B2 for rotation connection of the left-side rotation connection structure and the intermediate support structure and rotation connection of the right-side rotation connection structure and the intermediate support structure are both higher than the flexible screen support surface 10 of the intermediate support structure and are close to or positioned at a height of a neutral layer of a flexible screen. The height of a neutral layer of a flexible screen refers to a position height which does not extend or shorten when the flexible screen 400 is bent and unfolded in a thickness direction of the flexible screen 400.

The connection structures between the left-side rotation connection structure and the intermediate support structure and between the right-side rotation connection structure and the intermediate support structure each comprises two segments of concentric rotation connection structures, and each segment of rotation connection structure adopts an arc guide rail and arc sliding block rotation connection structure; and front-back connection of the two segments of rotation connection structures in a rotation stroke is achieved through a limiting structure. In an embodiment, a left-side rotation connection structure and a right-side rotation connection structure both comprise rotation connection arms 41 and 42, and the rotation connection arms 41 and 42 are respectively rotatably connected to the mounting foundation 301 through intermediate rotation blocks 302 and 303; the rotation connection arm 41 of the left-side rotation connection structure is rotatably connected to the intermediate rotation block 302 through an arc guide rail 44 and an arc sliding block 43; the intermediate rotation block 302 is rotatably connected to the intermediate support structure through an arc guide rail 47 and an arc sliding block 46; and the front and back driving connection of two segments of concentric rotation connection structures on a rotation stroke is realized through a limiting structure. The rotation connection arm 42 of the right-side rotation connection structure is rotatably connected to the intermediate rotation block 303 through an arc guide rail 44 and an arc sliding block 43; the intermediate rotation block 303 is rotatably connected to the intermediate support structure through an arc guide rail 47 and an arc sliding block 46; and the front and back driving connection of two segments of concentric rotation connection structures on a rotation stroke is realized through a limiting structure.

The intermediate support structure is also internally provided with pressing structures of the left-side rotation connection structure and the right-side rotation connection structure, so that the looseness between the left-side rotation connection structure and the intermediate support structure and between the right-side rotation connection structure and the intermediate support structure is prevented or reduced.

Figure 10:
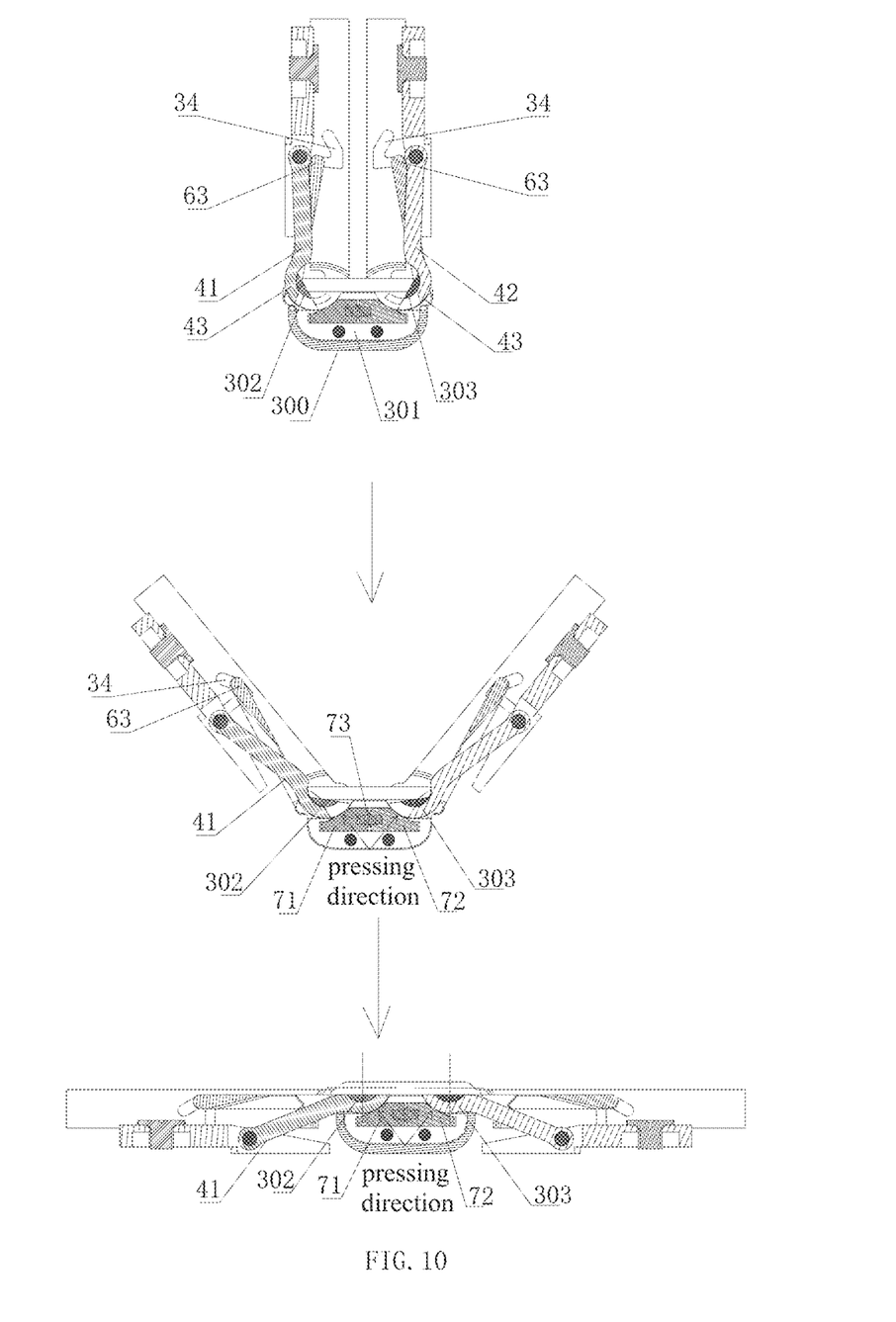
FIG. 10 is a movement presentation diagram of a movement structure provided by the present invention in a process from folding to opening and unfolding of an inner-folding flexible screen terminal.

The pressing structures adopt pressing block and spring support structures, wherein pressing blocks include a pressing block 71 acting on an inner end of the left-side rotation connection arm 41 and a pressing block 72 acting on an inner end of the right-side rotation connection arm 42; the pressing block 71 and the pressing block 72 can share one spring support structure; and the pressing structures act on the inner ends of the rotation connection arms to press gaps between components in the rotation connection structures. The spring support structure can be a pressure spring 73. The pressing directions of the pressing structures are radial directions or pressing directions providing rotating opening torque for the left-side rotation connection structure and the right-side rotation connection structure. By controlling a pressing contact angle, when the inner-folding flexible screen terminal is in an opened and unfolded state, the pressing directions are obliquely upward and outward directions shown in FIG. 10.

The movement mechanism is further provided with a left-side movable support plate 61 and a right-side movable support plate 62, and the left-side movable support plate 61 and the right-side movable support plate 62 are respectively rotatably connected with an upper portion of a left side and an upper portion of a right side of the intermediate support structure; the reference number 60 is a connecting shaft; the left-side movable support plate 61 and the right-side movable support plate 62 are further movably connected with the left-side support frame 31 and the right-side support frame 32 respectively; the left-side support frame 31 and the right-side support frame 32 are provided with guide limit holes 34, and the left-side movable support plate 61 and the right-side movable support plate 62 are provided with guide pins 63 that match with the guide limit holes 34. When the flexible screen terminal is unfolded, the hole wall of the guide limit hole 34 supports the guide pin 63.

The left-side rotation connection arm 41 and the right-side rotation connection arm 42 are bent downwards, and outer-side ends of the rotation connection arms respectively extend to lower portions of a left-side movable support plate 61 and a right-side movable support plate 62 and are connected to a left-side connecting member 51 and a right-side connecting member 52 through shafts 45; and the left-side connecting member 51 and the right-side connecting member 52 are respectively positioned below the left-side movable support plate 61 and the right-side movable support plate 62.

The synchronous reverse rotation connection mechanism can adopt a gear connection structure and comprises a gear connection frame 2, wherein the gear connection frame 2 is arranged at an end portion of the intermediate support structure; the synchronous mechanism is provided with four gears 21, 22, 23 and 24 which are sequentially meshed and connected; and gear shafts of the gears 21 and 24 are respectively connected to the left-side support frame 31 and the right-side support frame 32, and axes of the gears are used as rotation axes of the left-side support frame 31 and the right-side support frame 32. The rotation axes of the left-side support frame 31 and the right-side support frame 32 are lower than the flexible screen support surface 10. The positions of the rotation axes of the left-side support frame 31 and the right-side support frame 32 in a left-right direction are closer to a center line of the intermediate support structure than rotation axes of the left-side rotation connection arm 41 and the right-side rotation connection arm 42, or the positions of the rotation axes of the left-side rotation connection arm 41 and the right-side rotation connection arm 42 are at an outer side relative the rotation axes of the left-side support frame 31 and the right-side support frame 32 in the left-right direction.

Sliding guide structures are arranged between the left-side support frame 31 and the left-side connecting member 51 and between the right-side support frame 32 and the right-side connecting member 52.

Each guide structure comprises a guide shaft 33 and a guide sleeve 54 matched with the guide shaft 33, and the guide sleeves are arranged on side edges of the left-side connecting member 51 and the right-side connecting member 52.

Figures 1, 2:
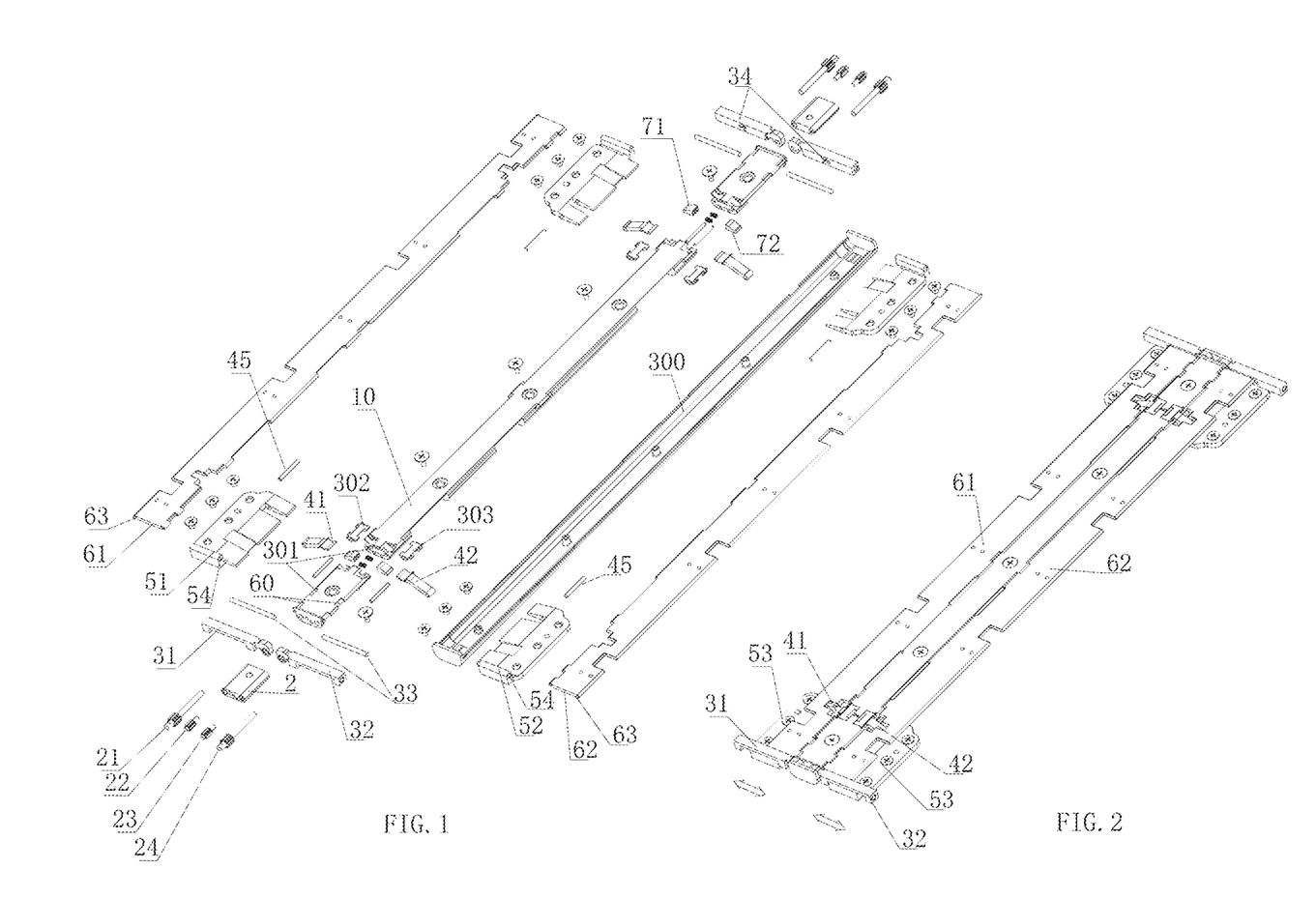
FIG. 1 is an exploded view of a movement mechanism according to an embodiment of the present invention.
FIG. 2 is a schematic diagram of a movement mechanism according to an embodiment of the present invention after a left-side movable plate and a right-side movable plate are hidden when an inner-folding flexible screen terminal is opened and unfolded.
Figure 3:
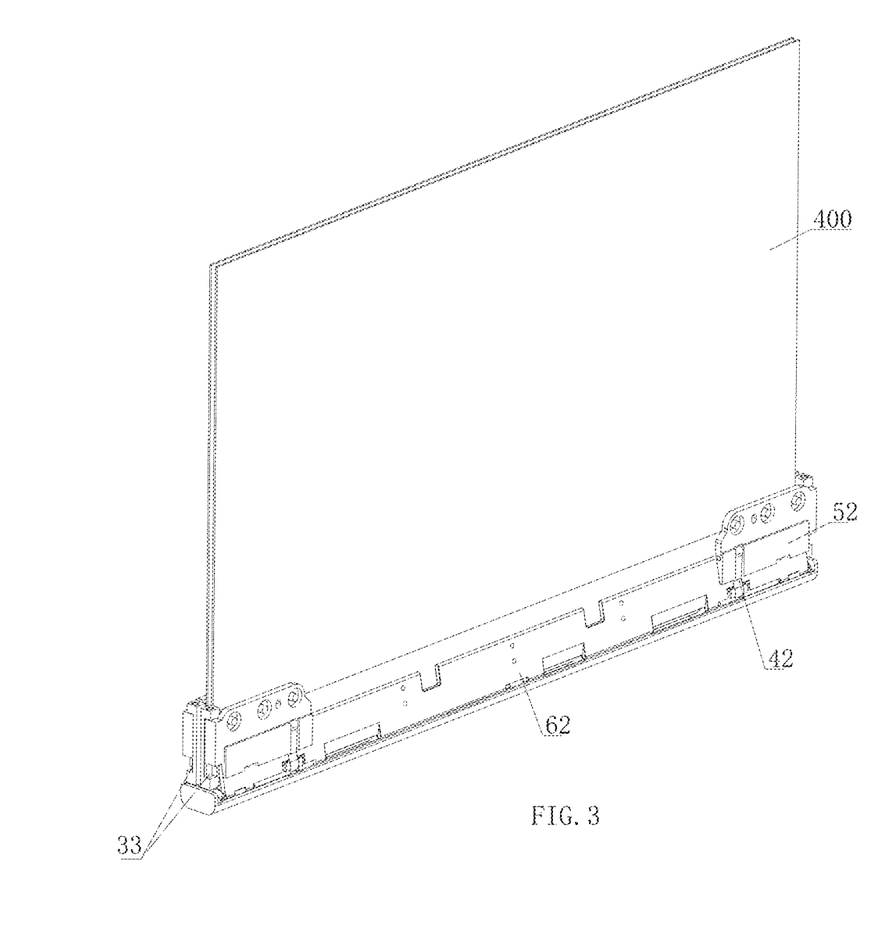
FIG. 3 is a schematic diagram of a movement mechanism according to an embodiment of the present invention when an inner-folding flexible screen terminal is folded.
Figure 4:
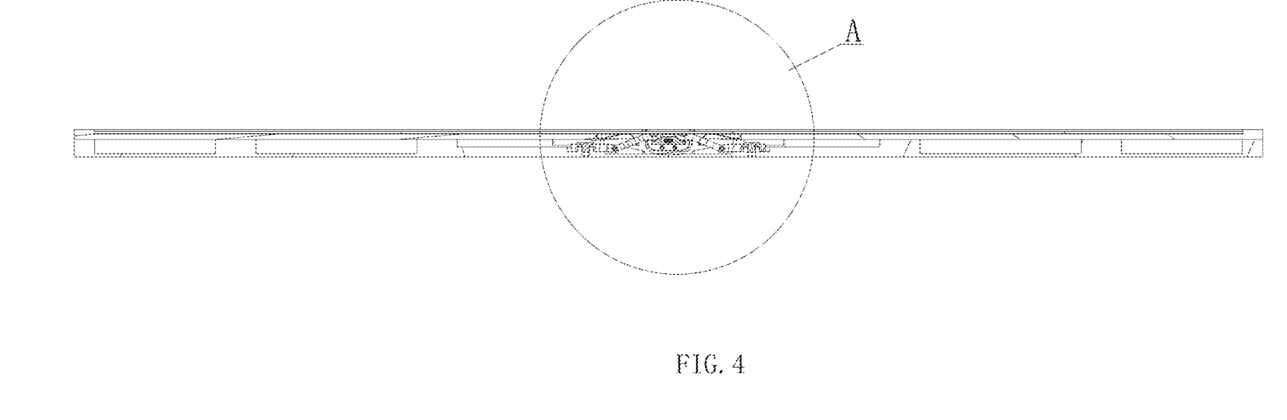
FIG. 4 is a sectional view of an inner-folding flexible screen terminal, in an unfolded state, provided by the present invention.
Figure 5:
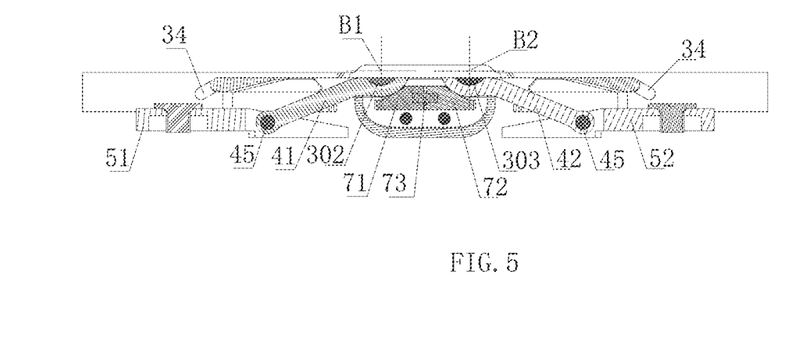
FIG. 5 is an enlarged view of a part A in FIG. 4.
Figure 6:
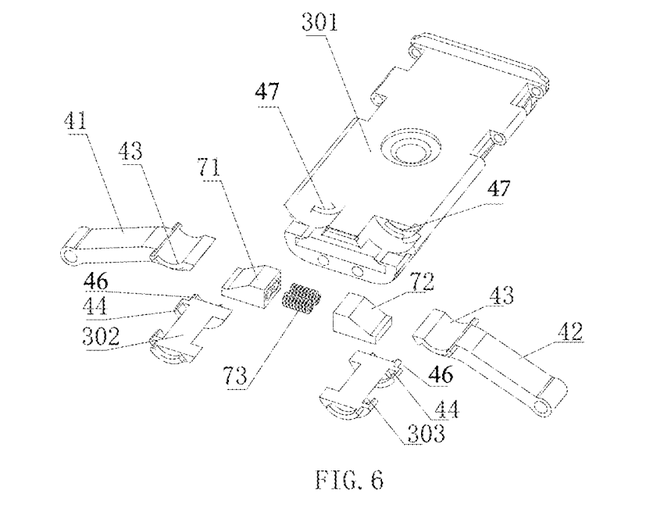
FIG. 6 is an exploded view of a left-side rotation connection structure and a right-side rotation connection structure matched with pressing structures.
Figure 7:
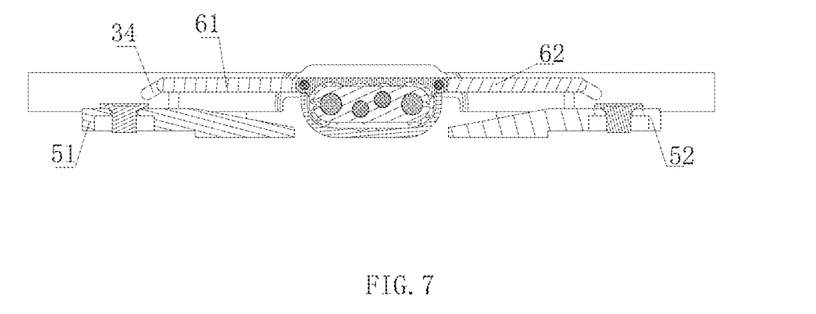
FIG. 7 is a sectional view of a left-side rotation connection structure and a right-side rotation connection structure matched with pressing structures.
Figure 8:
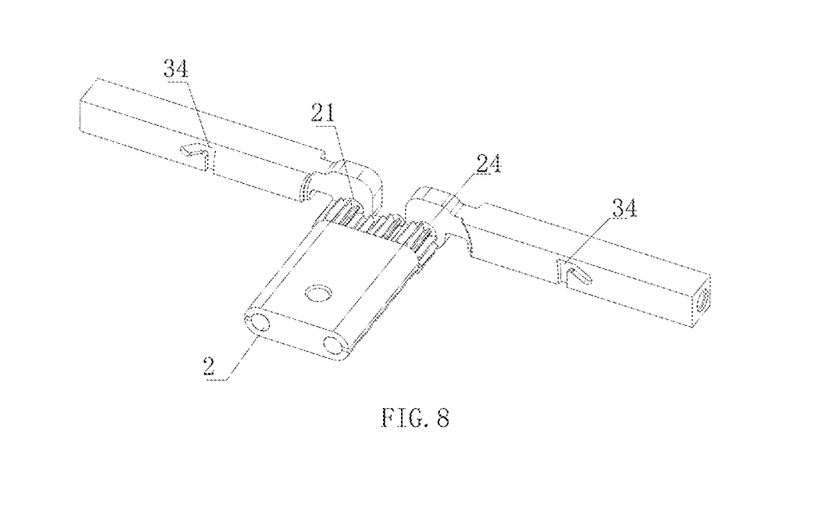
FIG. 8 is a schematic diagram of combination of a left-side mounting frame and a right-side mounting frame with a synchronous reverse rotation connection mechanism in an embodiment in FIG. 1.
Figure 9:
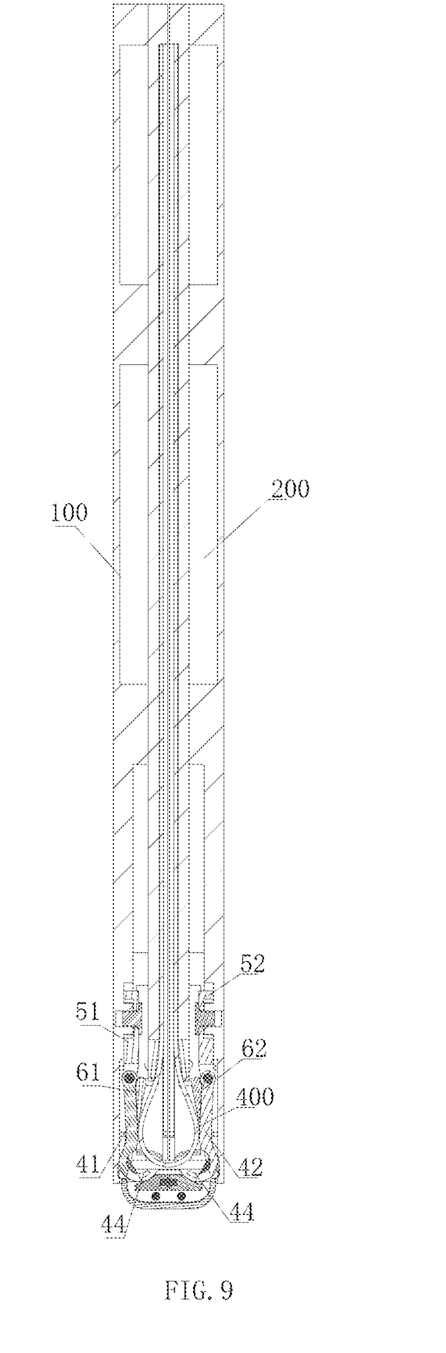
FIG. 9 is a sectional view of an inner-folding flexible screen terminal, in a folded state, provided by the present invention.

The movement mechanism is further provided with structures for increasing resistance when the flexible screen terminal is unfolded and folded in a rotating mode, and the mechanism can be used for providing the function of stopping rotation at any time and positioning at any time or only providing the operation hand feeling. As shown in FIG. 8, the structures can be arranged by utilizing the synchronous reverse rotation connection mechanism, holes in the gear shafts of the corresponding gears 21 and 24 of the gear connection frame 2 are arranged to be of reed pipe structures, and the reed pipe structures are used for clamping the gear shafts of the gears 21 and 24 to provide resistance.

The structures for increasing resistance can also be arranged at the sliding guide structures, the structures comprise reed pipes, and the reed pipes are respectively connected to the side edges of the left-side connecting member 51 and the right-side connecting member 52; the guide sleeves 54 are respectively arranged in front of and behind the reed pipes; the guide shafts 33 are respectively connected to the left-side support frame and the right-side support frame; and the reed pipes are used for clamping the guide shafts 33. Therefore, gaps of the structures can be conveniently removed, the quality can be improved, and meanwhile, the resistance is more simple and convenient to adjust.

When the present invention is applied to the inner-folding flexible screen terminal, the flexible screen 400 is positioned at an inner side of the mobile terminal; the left-side casing 100 and the left-side connecting member 51 are connected through a screw; the right-side casing 200 and the right-side connecting member 52 are connected; the flexible screen is respectively fixedly connected to the left-side casing 100 and the right-side casing 200; when the flexible screen terminal is unfolded, the flexible screen is supported by support plates in the left-side casing and the right-side casing from two sides, the flexible screen support surface 10 is arranged in the intermediate portion, and the left-side movable support plate 61 and the right-side movable support plate 62 can be used for supporting.

The foregoing descriptions only describe the specific embodiments of the present invention, but the structural features of the present invention are not limited thereto. It is foreseeable that the motion mechanism of the present invention can be applied to various flexible screen mobile terminals. Any changes or modifications made by those skilled in the art within the scope of the present invention shall fall within the scope of protection of the present invention.

The invention claimed is:

1. A movement mechanism applied to an inner-folding flexible screen terminal, comprising:
    an intermediate support structure, including a flexible screen support surface, wherein the intermediate support structure is connected to a left-side support frame and a right-side support frame through a synchronous reverse rotation connection mechanism,
    a left-side rotation connection structure,
    a right-side rotation connection structure,
    a left-side connecting member, and
    a right-side connecting member, wherein inner ends of the left-side rotation connection structure and the right-side rotation connection structure are both rotatably connected to the intermediate support structure, the left-side connecting member and the right-side connecting member are respectively rotatably connected to outer ends of the left-side rotation connection structure and the right-side rotation connection structure, the left-side connecting member and the right-side connecting member are respectively slidably connected to the left-side support frame and the right-side support frame, and sliding directions of the left-side connecting member and the right-side connecting member are perpendicular to rotation axes of the left-side support frame and the right-side support frame, and the left-side connecting member and the right-side connecting member are respectively arranged at connecting positions of a left-side casing and a right-side casing of the flexible screen terminal;
    wherein positions of rotation axes of the left-side rotation connection structure and the left-side support frame are configured in a mode that in a process from unfolding to folding of the flexible screen terminal, the left-side connecting member moves in a direction away from the intermediate support structure, and in a process from folding to unfolding of the flexible screen terminal, the left-side connecting member moves towards the intermediate support structure;
    wherein positions of rotation axes of the right-side rotation connection structure and the right-side support frame are configured in a mode that in the process from unfolding to folding of the flexible screen terminal, the right-side connecting member moves in a direction away from the intermediate support structure, and in the process from folding to unfolding, the right-side connecting member moves towards the intermediate support structure;
    wherein the rotation axes for rotation connection of the left-side rotation connection structure and the intermediate support structure and rotation connection of the right-side rotation connection structure and the intermediate support structure are both higher than the flexible screen support surface of the intermediate support structure and are close to or positioned at a height of a neutral layer of a flexible screen;
    wherein the intermediate support structure is internally provided pressing structures of the left-side rotation connection structure and the right-side rotation connection structure.

2. The movement mechanism applied to the inner-folding flexible screen terminal according to claim 1, wherein the left-side rotation connection structure and the right-side rotation connection structure each comprises a rotation connection arm, the rotation connection arms are rotatably connected to the intermediate support structure through intermediate rotation blocks, and the rotation connection arms and the intermediate rotation blocks are rotatably connected through arc guide rails and arc sliding blocks.

3. The movement mechanism applied to the inner-folding flexible screen terminal according to claim 2, wherein the pressing structures abut on inner ends of the rotation connection arms.

4. The movement mechanism applied to the inner-folding flexible screen terminal according to claim 1, wherein the pressing structures adopt pressing block and spring support structures, and the pressing directions of the pressing structures are radial directions or pressing directions providing a rotating opening torque for the left-side rotation connection structure and the right-side rotation connection structure.

5. The movement mechanism applied to the inner-folding flexible screen terminal according to claim 4, wherein when the inner-folding flexible screen mobile terminal is in an opening and unfolding state, the pressing directions are obliquely upward and outward directions.

6. The movement mechanism applied to the inner-folding flexible screen terminal according to claim 1, comprising a left-side movable support plate and a right-side movable support plate, and wherein the left-side movable support plate and the right-side movable support plate are respectively rotatably connected with an upper portion of a left side and an upper portion of a right side of the intermediate support structure; the left-side movable support plate and the right-side movable support plate are further movably connected with the left-side support frame and the right-side support frame respectively, and through connection cooperation of the left-side support frame and the right-side support frame with the left-side movable support plate and the right-side movable support plate, the rotation of the left-side movable support plate and the right-side movable support plate can be controlled, and the left-side movable support plate and the right-side movable support plate are supported when the inner-folding flexible screen terminal is unfolded.

7. The movement mechanism applied to the inner-folding flexible screen terminal according to claim 1, comprising a left-side movable support plate and a right-side movable support plate, outer-side ends of the left-side rotation connection structure and the right-side rotation connection structure respectively extend into lower portions of the left-side movable support plate and the right-side movable support plate, and the left-side connecting member and the right-side connecting member are respectively positioned below the left-side movable support plate and the right-side movable support plate.

8. The movement mechanism applied to the inner-folding flexible screen terminal according to claim 1, wherein rotation centers of the left-side support frame and the right-side support frame are lower than the flexible screen support surface;
   positions of the rotation centers of the left-side support frame and the right-side support frame in a left-right direction are closer to a center line of the intermediate support structure than rotation centers of the left-side rotation connection structure and the right-side rotation connection structure.

9. The inner-folding flexible screen terminal comprising the flexible screen, the left-side casing and the right-side casing, wherein the inner-folding flexible screen terminal further comprises the movement mechanism applied to the inner-folding flexible screen terminal of claim 1, the left-side casing is connected with the left-side connecting member, the right-side casing is connected with the right-side connecting member, the flexible screen is respectively fixedly connected with the left-side casing and the right-side casing, and when the flexible screen terminal is unfolded, the flexible screen is supported by support plates in the left-side casing and the right-side casing.

* * * * *